United States Patent
Kaplan

(10) Patent No.: US 10,533,090 B2
(45) Date of Patent: Jan. 14, 2020

(54) USE OF TRIAZINES FOR SELECTIVE MODIFICATION OF NATURAL POLYMERS

(71) Applicant: General Electric Company, Schenectady, NY (US)

(72) Inventor: Gregory Kaplan, Richboro, PA (US)

(73) Assignee: General Electric Company, Schenectady, NY (US)

( * ) Notice: Subject to any disclaimer, the term of this patent is extended or adjusted under 35 U.S.C. 154(b) by 144 days.

(21) Appl. No.: 15/580,512

(22) PCT Filed: Apr. 25, 2016

(86) PCT No.: PCT/US2016/029167
§ 371 (c)(1),
(2) Date: Dec. 7, 2017

(87) PCT Pub. No.: WO2016/204864
PCT Pub. Date: Dec. 22, 2016

(65) Prior Publication Data
US 2018/0163051 A1    Jun. 14, 2018

Related U.S. Application Data

(60) Provisional application No. 62/175,518, filed on Jun. 15, 2015.

(51) Int. Cl.
| | |
|---|---|
| C08L 99/00 | (2006.01) |
| C10L 9/10 | (2006.01) |
| C02F 1/56 | (2006.01) |
| C08G 73/06 | (2006.01) |
| C08L 79/04 | (2006.01) |

(Continued)

(52) U.S. Cl.
CPC ............ *C08L 99/00* (2013.01); *C02F 1/56* (2013.01); *C08F 2/16* (2013.01); *C08G 73/0638* (2013.01); *C08L 79/04* (2013.01); *C10L 9/10* (2013.01); *C02F 2101/32* (2013.01); *C02F 2103/007* (2013.01); *C02F 2103/16* (2013.01); *C02F 2103/32* (2013.01); *C02F 2103/365* (2013.01)

(58) Field of Classification Search
None
See application file for complete search history.

(56) References Cited

U.S. PATENT DOCUMENTS

| | | | | |
|---|---|---|---|---|
| 3,513,001 A | * | 5/1970 | Woodhead | ............... B22C 1/22 106/38.51 |
| 3,896,166 A | | 7/1975 | Kaiser et al. | |

(Continued)

FOREIGN PATENT DOCUMENTS

WO    WO 2014/209452 A1    12/2014

OTHER PUBLICATIONS

Pizzi, A., "Condensed Tannins for Adhesives", Ind. Eng. Chem., Prod. Res. Dev., 21, pp. 359-369, 1982.

(Continued)

*Primary Examiner* — Peter A Salamon
(74) *Attorney, Agent, or Firm* — Wegman Hessler

(57) ABSTRACT

Methods of reacting tannin/triazine and acid in a liquid medium and reaction products prepared by these methods. The reaction products may be used in a variety of water clarification applications and may also be utilized to inhibit coal auto oxidation and dust dissemination from coal mining, coal storage and coal transport applications.

10 Claims, 2 Drawing Sheets

(51) Int. Cl.
*C08F 2/16* (2006.01)
*C02F 101/32* (2006.01)
*C02F 103/00* (2006.01)
*C02F 103/16* (2006.01)
*C02F 103/32* (2006.01)
*C02F 103/36* (2006.01)

(56) References Cited

U.S. PATENT DOCUMENTS

| | | | | |
|---|---|---|---|---|
| 4,558,080 | A | * | 12/1985 | Quamme ............ C02F 1/5263 210/723 |
| 6,160,096 | A | * | 12/2000 | Sakashita ................ D01F 4/00 530/356 |
| 6,713,537 | B1 | * | 3/2004 | Ueda ........................ D01F 4/00 524/17 |
| 2018/0163051 | A1 | * | 6/2018 | Kaplan .................... C02F 1/56 |

OTHER PUBLICATIONS

International Search Report and Written Opinion dated Aug. 31, 2016 in PCT/US2016/029167 filed Apr. 25, 2016.
International Preliminary Report on Patentability dated Dec. 28, 2017 in PCT/US2016/029167 filed Apr. 25, 2016.

* cited by examiner

USE OF TRIAZINES FOR SELECTIVE MODIFICATION OF NATURAL POLYMERS

CROSS-REFERENCE TO RELATED APPLICATIONS

This application claims the benefit of U.S. Provisional Patent Application Ser. No. 62/175,518 filed Jun. 15, 2015, and PCT/US2016/029167 filed Apr. 25, 2016.

BACKGROUND OF THE INVENTION

The use of modified tannin polymers has been known. One popular product is a reaction product of tannin/amine and formaldehyde that is used as a water clarification product. These types of products have demonstrated good performance, for example, in the removal of residual oil from wastewater. However, in certain instances, these reaction products must be made by complex and sensitive manufacturing processes and they may also pose storage and short product shelf life issues.

Byproducts such as secondary and tertiary amines are often formed during the preparation of these products, resulting in increased cost and an unstable product. Another problem is formation of gaseous carbon dioxide, which causes foaming and minimizes loading of reactors during manufacturing, thus increasing manufacturing costs.

The manufacture of these tannin/amine/formaldehyde reaction products also results in significant levels of formaldehyde on the order of 3,000-4,000 ppm and more. Formaldehyde can result in immune system problems and is also a cancer hazard. Exposure to formaldehyde can be irritating to the eyes, nose, and throat and can cause coughing and wheezing. Prolonged exposure can cause severe allergic reaction of the skin, eyes and respiratory tract.

Recently, residual formaldehyde levels have been subjected to increased global security and materials containing more than 1,000 ppm of residual formaldehyde are being banned or limited in commercial applications due to human and environmental hazards. Attempts at increasing the temperature or time of the tannin/amine/formaldehyde reaction to drive the residual formaldehyde to less than 1,000 ppm causes unwanted crosslinking of tannin, gelling and solidification of product batches.

Removal of formaldehyde from the known tannin/amine/formaldehyde products is challenging. Formaldehyde exists in the aqueous reaction product solutions in a polymeric or hydrated form. The latter is referred to as methanediol and has a boiling point of 194° C. Thus, it is impossible to distill this compound from aqueous solutions.

Formaldehyde scavengers may be used in order to reduce formaldehyde concentration levels. However, due to the low concentration of formaldehyde in the aqueous reaction media, multiple stoichiometric excesses of formaldehyde scavenger are necessary, resulting in increased costs, toxicity, and reduced activity of the desired amine/tannin product.

SUMMARY OF THE INVENTION

In one exemplary embodiment of the invention a method is provided for forming an amine functionalized tannin based polymer compound comprising reacting tannin, triazine and an acid under heated conditions in a liquid medium such as an aqueous medium. In other embodiments of the invention, the triazine is present in an amount of about 0.5-5 moles triazine per one kilogram of tannin. In other embodiments of the invention, the reaction is conducted at temperatures of about 60-100° C. In one aspect of the invention, the tannin may be present in dry powder form and the triazine may be an alkyl or hydroxylated alkyl s-triazine.

The acid reactant may be chosen from a host of acids including mineral and organic acids. In one embodiment, the acid is hydrochloric acid.

In another aspect of the invention, amine functionalized tannin reaction products are formed in an aqueous reaction medium. These products are dissolved or dispersed in the aqueous reaction medium with formaldehyde levels of the medium being less than 1,000 ppm based on one thousand parts of the medium. In some instances, the content of the reaction medium is on the order of about 600 ppm or less, and in some instances, the formaldehyde content is about 500-600 ppm.

In other embodiments of the invention, methods for clarifying aqueous media are provided wherein an aqueous medium is treated with about 1-1,000 ppm of the tannin based reaction product compounds of the invention. The aqueous medium may comprise river water having clay particles disposed therein, oil refinery wastewater with oil dispersed therein, steel mill wastewater with oil particles dispersed therein, or agricultural or food industrial wastewater. In other embodiments, the aqueous medium may comprise crude oil from a fracking or SAGD operation. In other embodiments, the aqueous medium to be treated is produced water from an oil field operation or the medium may be industrial wastewater. In other embodiments of the invention, the tannin/triazine/acid reaction products are utilized to inhibit auto oxidation or spontaneous combustion of coal. In these embodiments, from about 0.01-10 pounds of the reaction product are added to the coal per ton of coal. In other embodiments, the reaction products of the invention are utilized to inhibit dust generation from coal such as exists during the transport, mining or storage of the coal. In these embodiments, the reaction products of the invention are added to the coal in an amount of 0.01-10 pounds of the reaction product per ton of coal.

BRIEF DESCRIPTION OF THE DRAWINGS

This invention will be further described in the appended drawings wherein.

DETAILED DESCRIPTION

Figure 1:
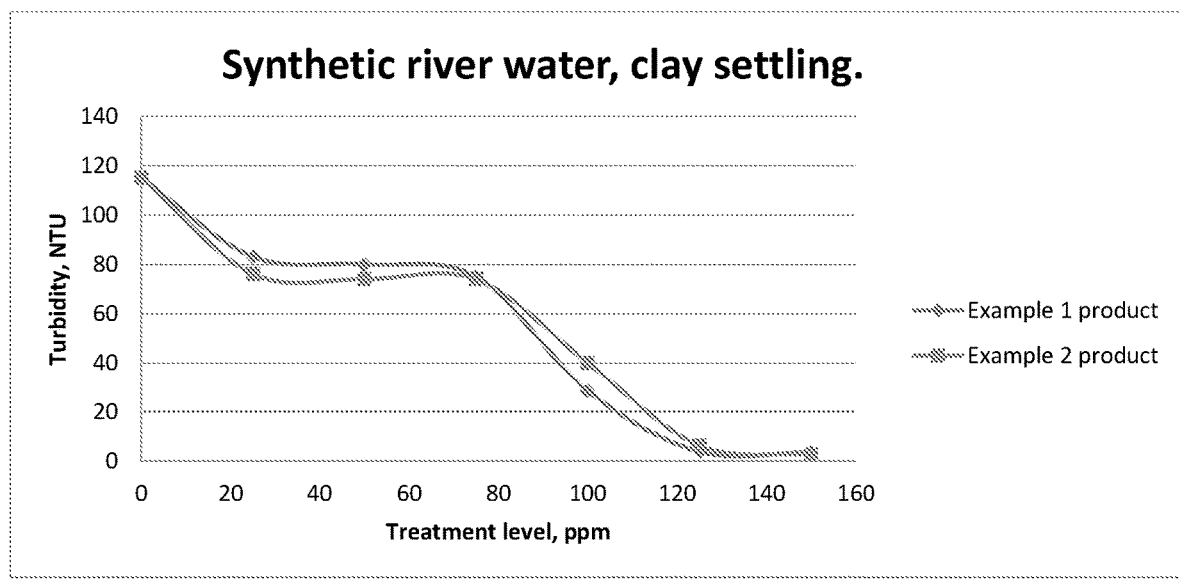
FIG. 1 is a graphical representation of the results obtained upon use of the reaction products of the invention in synthetic river water clay settling tests as referred to in Example 3.

In one aspect of the invention, triazines, such as $C_1$-$C_5$ alkyl or $C_1$-$C_5$ hydroxylated s-triazine are employed as a reactant with tannin polymers and an acid in order to form amine substituted polymeric tannin products. These reactions minimize residual formaldehyde otherwise formed as a result of known tannin/formaldehyde/amine Mannich reactions.

Triazines are cyclic six-member ring molecules and can be prepared and stored by themselves or they can be prepared in the same reaction vessel into which the tannin and acid are introduced. Reaction of triazines with tannin and acid is relatively mild, selective, and easily controlled, resulting in products having acceptable shelf life.

As to the tannin reactant that is to be employed, these are well known as reported for example in U.S. Pat. No. 4,558,080. These tannin components can be obtained from various wood and vegetation materials found throughout the world. Tannins are a large group of water-soluble, complex organic compounds. Almost every tree or shrub that grows contains some tannins in the leaves, twigs, barks, wood or fruit. Examples of barks are wattle, mangrove, oak, eucalyptus, hemlock, pine, larch and willow. Examples of woods are the quebracho, chestnut, oak, and urunday. Examples of fruits are myrobalans, valonia, divi-divi, tara, and algarrobilla. Examples of leaves are sumac and gambier and examples of roots are canaigre and palmetto. Among the exemplary materials are quebracho wood. A spray-dried quebracho powder is commercially available and may be used as the tannin reactant in one embodiment.

These natural tannins can be categorized into the traditional "hydrolyzable" tannins and "condensed tannins" as disclosed by A. Pizzi in "Condensed Tannins for Adhesives", *Ind. Eng. Chem. Prod. Res. Dev.* 1982, 21, 359-369. Condensed tannin extracts are those manufactured from the bark of the black wattle tree (or mimosa tannin of commerce), from the wood of the quebracho tree (Spanish: Quebra hacha, axe-breaker), from the bark of the hemlock tree, and from the bark of several commonly used pine species. The preparation of wattle and quebracho extracts is a well established industrial practice and they are freely available in considerable amounts.

Condensed tannin extracts, such as wattle and quebracho, are composed of approximately 70% polyphenolic tannins, 20% to 25% nontannins, mainly simple sugars and polymeric carbohydrates (hydrocolloid gums), the latter of which constitute 3% to 6% of the extract and heavily contribute to extract viscosity, while the balance is accounted for by a low percentage of moisture. Although the exact structure is not known, it is believed that the main polyphenolic pattern in quebracho tannins may be represented by the following structural Formula I showing a representative tannin fragment.

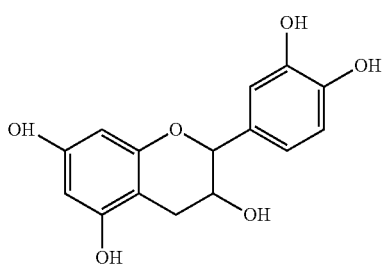

(I)

The triazines that are to be reacted with the tannin are alkylated or hydroxylated derivatives of a precursor triazine molecule having the empirical formula $C_3H_6N_3$. In certain embodiments, the triazines are alkylated or hydroxylated 1,3,5-triazines.

In some embodiments, exemplary triazines may be represented by the structural Formula II

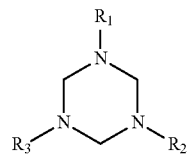

(II)

wherein $R_1$, $R_2$, and $R_3$ are each independently selected from H, $C_1$-$C_5$ alkyl and $C_1$-$C_5$ hydroxylated alkyl. Exemplary triazines include hexahydro-1,3,5-trimethyl-s-triazine and hexahydro-1,3,5-tris(hydroxyethyl)-s-triazine.

Acids are also reacted with the tannin and triazine. A host of exemplary acids including mineral and organic acids can be mentioned such as HCl, $H_2SO_4$, $HNO_3$, $H_3PO_4$, formic acid, acetic acid etc. In one embodiment of the invention, HCl can be used as a reactant. In certain exemplary embodiments the acid is present in the reaction medium in an equimolar amount based upon amine presence. Thus, in some embodiments, the acid is present in an amount of about three moles per mole of triazine (triazine having tri-amine functionality).

The reactants may be introduced into the reaction vessel along with a polar solvent such as water. In some instances, it may be beneficial to add co-solvents to the reaction vessel such as methanol or ethylene glycol in minor amounts (e.g., 5-20%) in order to improved product viscosity or provide freeze protection. After the reactants are dissolved or dispersed in the reaction medium, they are heated and stirred, for example, within the range of about 60-100° C. for a time period of about two to about six hours. In some cases, it may be advantageous to heat the reactants at a temperature of about 80-85° C. The pH of the reaction medium can be controlled in an acidic range with the pH maintained on the order of 0-4 or 1-3 in some instances.

After heating and stirring for the requisite time period in order to provide a satisfactory product yield, the reaction medium may be cooled for about an hour and then diluted with additional water to achieve an acceptable solids level of triazine modified tannin such as 20-50%, depending on ultimate end use application.

The reaction may be monitored for residual triazine levels by HPLC or NMR techniques in order to determine completion. The tannin polymer reaction product is typically dissolved in the reaction medium and may be used in solution.

In certain embodiments, the tannin is present as a dry powder and the triazine reactant is present in a molar amount of about 0.5-5 moles triazine:1 kilogram of tannin powder. The molecular weight or viscosity of the resulting tannin based polymer reaction products are not critical as long as the reaction product is soluble or dispersible in the aqueous reaction medium. In some exemplary embodiments, triazine is present in an amount of about 2 moles triazine:1 kilogram tannin.

The tannin polymer reaction products may desirably be used for a host of end use applications including: as coal additives to inhibit air oxidation and spontaneous combustion of coal, in dust prevention of coal and other air-borne particulates, as de-oiling and filtering aids, as demulsifiers or flocculants to clarify aqueous streams, in wastewater or municipal waste treatment systems, in agricultural and food industry wastewater treatment, in crude oil and natural gas production (fracking water, SAGD, mining, flood water, produced water), and in industrial water treatment (refineries, steel mills, chemical plants, mining, automotive).

In one exemplary embodiment, the tannin/triazine/acid polymer reaction products of the invention can be used as flocculants in order to clarify suspended particles and oils in natural waters or industrial wastewaters. Typically, in such applications, the reaction product may be added to the aqueous medium in need of clarification in an amount of about 1-1,000 ppm based upon 1 million parts of the aqueous medium. In other embodiments, the treatment level can be from about 1-300 ppm.

Based upon data now available, the tannin polymer reaction products can be used as flocculants in the clarification of natural waters such as rivers, ponds, lagoons, etc. in which clay or other solid particles are present. Additionally, in another embodiment, the reaction products can be used as a flocculant treatment in oily wastewaters such as in so-called produced waters in crude oil production, refining, and petrochemical operations or in oily industrial effluents or wastewaters such as may be encountered in steel mill and metal fabrication or processing operations.

The invention will be explained in conjunction with the following examples which are presented as being illustrative of certain embodiments of the invention.

EXAMPLES

Example 1

240 gm water was placed into a flask equipped with stirrer, heater, and temperature controller and then heated to 40° C. 222 gm of tannin was added over a period of 20 minutes. 138 gm of 36.5% hydrochloric acid was added over the period of 10 minutes. 66 gm of 90% solution of hexahydro-1,3,5-trimethyl-s-triazine was added to the reaction flask over a period of 10 minutes at 40° C. The reaction mixture was then heated to 85° C. and stirred for about three hours. DI water and hydrochloric acid were added to bring the product into the desired specification.

Example 2

76 gm of water was admitted into a flask equipped with stirrer, heater, and temperature controller and then heated to 40° C. 79 gm of tannin was added over a period of 20 minutes. 46 gm of 36.5% hydrochloric acid was added over a period of 10 minutes. 70 gm of 55% solution of hexahydro-1,3,5-tris(hydroxyethyl)-s-triazine was added to the reaction flask over a period of 10 minutes at 40° C. The reaction mixture was then heated to 85° C. and stirred for about three hours. DI water and hydrochloric acid were added to bring the product into the desired specification.

Both of the triazine/tannin/acid reaction product media of Example 1 and Example 2 were tested for formaldehyde content by NMR analysis. Each product media was found to contain about 500-600 ppm of residual formaldehyde which was most probably formed from triazine decomposition under the Example 1 and 2 reaction conditions.

Clarification Test Procedure:

500 ml samples of the water to be tested were placed in a jar test apparatus. The reaction products of Examples 1 and 2 were added to the jar test apparatus, stirred for about seven minutes, and allowed to settle for about five minutes. Then, the resulting supernatant liquid was tested for turbidity using a HACH turbidimeter.

Example 3

These tests were undertaken on synthetic river water having suspended clay particles therein. Results are shown in FIG. 1.

Example 4

Figure 2:
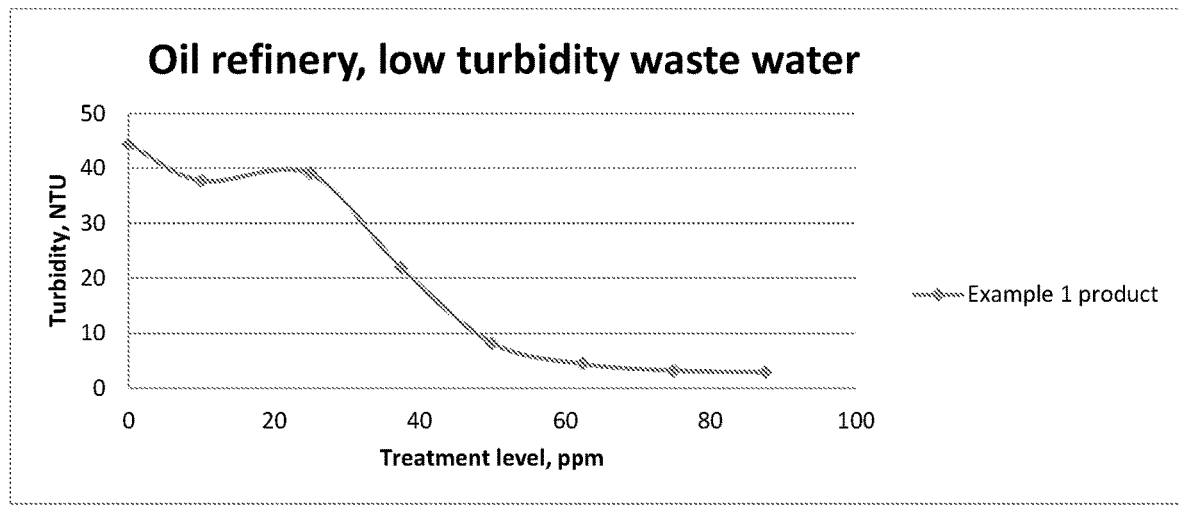
FIG. 2 is a graphical representation of the results obtained upon use of the reaction products of the invention in oil refinery low turbidity wastewater as reported in Example 4.

These tests were undertaken on oil refinery, low turbidity wastewater. Results are shown in FIG. 2.

Example 5

Figure 3:
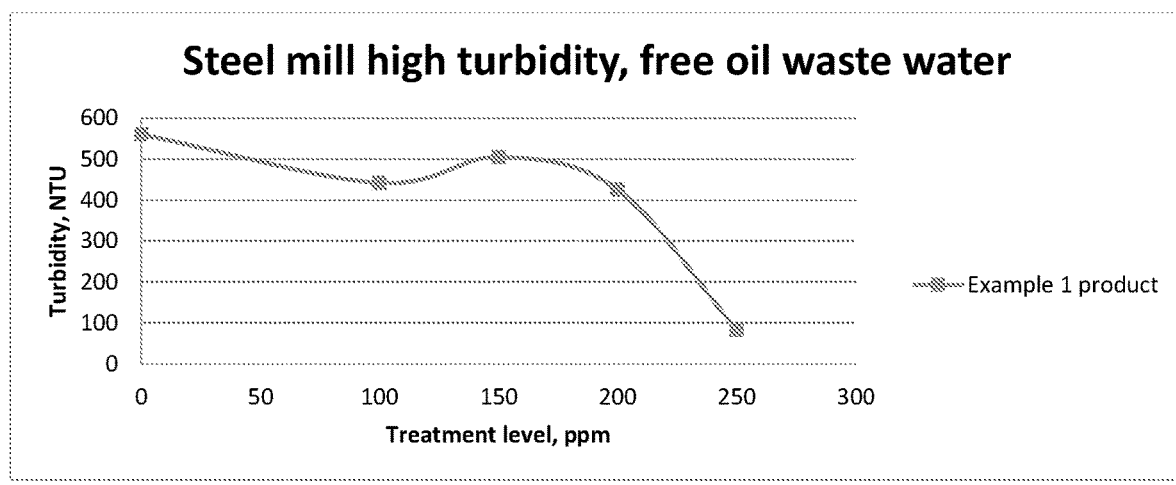
FIG. 3 is a graphical representation of the results obtained upon use of the reaction products of the invention in free oil settling tests in high turbidity steel mill wastewater as reported in Example 5.

These tests were undertaken on oily, high turbidity wastewater from a steel mill. Results are shown in FIG. 3.

While this invention has been described in conjunction with the specific embodiments described above, it is evident that many alternatives, combinations, modifications, and variations are apparent to those skilled in the art. Accordingly, the specific embodiments of this invention, as set forth above, are intended to be illustrative only, and should not be construed in a limiting sense. Various changes can be made without departing from the spirit and scope of this invention. Therefore, the technical scope of the present invention encompasses not only those embodiments described above, but also all that fall within the scope of the appended claims.

The invention claimed is:

1. A method of forming a tannin based polymer compound comprising reacting tannin, triazine and an acid under heated conditions in a liquid medium, wherein said triazine has the formula

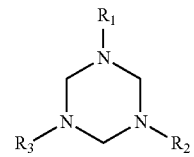

wherein $R_1$, $R_2$, and $R_3$ are independently chosen from H, $C_1$-$C_5$ alkyl and $C_1$-$C_5$ hydroxylated alkyl.

2. The method as recited in claim 1 wherein said liquid medium is an aqueous medium.

3. The method as recited in claim 2 wherein about 0.5-5 moles of said triazine is present per one kilogram of tannin.

4. The method as recited in claim 2 wherein said acid is present in an amount of about 3 moles acid:1 mole triazine.

5. The method as recited in claim 4 wherein said liquid medium is heated to a temperature of about 60 to 100° C.

6. The method as recited in claim 5 wherein said tannin is in dry powder form.

7. The method as recited in claim 1, wherein $R_1$, $R_2$, and $R_3$ are all methyl or all hydroxyethyl.

8. The method as recited in claim 5 wherein said acid is a mineral acid, HCl, or an organic acid.

9. The method as recited in claim 2 wherein said tannin based polymer is dissolved or dispersed in said aqueous medium, said medium having a formaldehyde content of less than about 1,000 ppm.

10. The method as recited in claim 9 wherein said formaldehyde content is less than or equal to about 600 ppm.

* * * * *